(12) United States Patent
Krainov

(10) Patent No.: US 11,708,934 B2
(45) Date of Patent: Jul. 25, 2023

(54) REINFORCED REMOVABLE THERMAL INSULATION (ASTI)

(71) Applicant: PUBLIC JOINT-STOCK COMPANY MACHINE-BUILDING PLANT "ZIO-PODOLSK", Moskovskaya obl. (RU)

(72) Inventor: Boris Vladimirovich Krainov, Moskovskaya obl. (RU)

(73) Assignee: Public Joint-Stock Company "Machine-Building Plant"Zio-Podolsk, Moscow (RU)

( * ) Notice: Subject to any disclaimer, the term of this patent is extended or adjusted under 35 U.S.C. 154(b) by 715 days.

(21) Appl. No.: 16/603,542

(22) PCT Filed: Apr. 6, 2018

(86) PCT No.: PCT/RU2018/000222
§ 371 (c)(1),
(2) Date: Jan. 23, 2020

(87) PCT Pub. No.: WO2018/186773
PCT Pub. Date: Oct. 11, 2018

(65) Prior Publication Data
US 2020/0149675 A1  May 14, 2020

(30) Foreign Application Priority Data

Apr. 7, 2017  (RU) .......................... RU2017111880

(51) Int. Cl.
*B32B 3/00* (2006.01)
*F16L 59/02* (2006.01)
(Continued)

(52) U.S. Cl.
CPC ............. *F16L 59/028* (2013.01); *F16L 59/04* (2013.01); *F16L 59/08* (2013.01); *F16L 59/14* (2013.01)

(58) Field of Classification Search
CPC ......... F16L 59/028; F16L 59/04; F16L 59/08; F16L 59/14
(Continued)

(56) References Cited

U.S. PATENT DOCUMENTS 3,187,778 A * 6/1965 Peyton .................. F16L 59/024
138/143
3,415,408 A 12/1968 Seitz
(Continued)

FOREIGN PATENT DOCUMENTS

CN  102687356 A  9/2012
CN  104321579 A  1/2015
(Continued)

OTHER PUBLICATIONS

International Search Report and Written Opinion dated Sep. 20, 2018 for Application PCT/RU2018/000222 filed Apr. 6, 2018 (5 pages).

*Primary Examiner* — James F Hook
(74) *Attorney, Agent, or Firm* — Dentons US LLP

(57) ABSTRACT

The reinforced removable thermal insulation (PARTS) contains the heat-insulating blocks joined among themselves placed on an external surface of the heat-isolated equipment. The Asti block is filled with heat-insulating material and consists of a reinforcing frame lattice sheathed on all sides with facing stainless sheets. For mutual detachable connection of heat-insulating blocks between themselves the lock latch is used. When using the proposed lock-latch, a guaranteed tightness is provided, the disclosure of thermal gaps between the side faces of thermal insulation blocks from the inaccessible internal bases of thermal insulation at tempera- (Continued)

ture fluctuations is excluded, fitting works and welding of tension locks on the surface of their blocks in place during installation and Assembly work on the equipment are excluded. Asti blocks are able to save the weight of stainless steel, increase the strength of thermal insulation blocks by 2.56 times, significantly reduce the cost of their manufacture.

8 Claims, 14 Drawing Sheets

(51) Int. Cl.
   *F16L 59/04* (2006.01)
   *F16L 59/08* (2006.01)
   *F16L 59/14* (2006.01)

(58) Field of Classification Search
   USPC .................. 138/149, 151, 158, 168; 428/57
   See application file for complete search history.

(56) References Cited

U.S. PATENT DOCUMENTS

| | | | | | |
|---|---|---|---|---|---|
| 3,649,398 | A | * | 3/1972 | Keith | B29C 67/20 |
| | | | | | 156/324 |
| 3,970,210 | A | | 7/1976 | Katsuta | |
| 4,170,451 | A | * | 10/1979 | Luff | F27D 3/022 |
| | | | | | 138/147 |
| 4,287,245 | A | * | 9/1981 | Kikuchi | F16L 59/024 |
| | | | | | 428/317.5 |
| 4,415,184 | A | * | 11/1983 | Stephenson | E21B 36/003 |
| | | | | | 285/47 |
| 4,424,027 | A | * | 1/1984 | Suey | F27D 3/022 |
| | | | | | 432/233 |
| 4,852,831 | A | * | 8/1989 | Sandstrom | F16L 59/135 |
| | | | | | 285/47 |
| 5,918,644 | A | * | 7/1999 | Haack | F24F 13/0281 |
| | | | | | 138/146 |
| 5,960,602 | A | | 10/1999 | Goss | |
| 5,996,643 | A | * | 12/1999 | Stonitsch | F16L 59/143 |
| | | | | | 138/143 |
| 9,958,105 | B1 | * | 5/2018 | Dye | F16L 59/026 |
| 2006/0188705 | A1 | * | 8/2006 | Fletcher | B32B 15/04 |
| | | | | | 428/304.4 |
| 2009/0084459 | A1 | * | 4/2009 | Williams | F16L 59/153 |
| | | | | | 29/455.1 |
| 2015/0260330 | A1 | * | 9/2015 | Tortorello | F16L 59/029 |
| | | | | | 428/601 |

FOREIGN PATENT DOCUMENTS

| | | |
|---|---|---|
| CN | 105318143 A | 2/2016 |
| FR | 2472716 A1 | 7/1981 |
| GB | 2039829 B | 9/1983 |
| JP | S53101761 A | 9/1978 |
| JP | S59176644 U | 11/1984 |
| JP | 2000088184 A | 3/2000 |
| JP | 2006258301 A | 9/2006 |
| JP | 2007309360 A | 11/2007 |
| JP | 2015519709 A | 7/2015 |
| RU | 2229654 C2 | 5/2004 |
| RU | 2259510 C1 | 8/2005 |
| RU | 2493473 C1 | 9/2013 |
| RU | 2582034 C2 | 4/2016 |
| SU | 1620768 A1 | 1/1991 |

* cited by examiner

REINFORCED REMOVABLE THERMAL INSULATION (ASTI)

CROSS-REFERENCE TO RELATED APPLICATIONS

This application is a U.S. 371 Application from PCT/RU2018/000222 filed Apr. 6, 2018 and RU Application No. 2017111880 filed Apr. 7, 2017, the technical disclosures of which are hereby incorporated herein by reference.

The invention relates to thermal insulation technology, and more specifically to the structures of thermal insulation of pipelines and cylindrical vessels.

From the achieved state of art, a prefabricated thermal insulation structure is known, comprising a tightly covering pipeline, a cylindrical shell of sequentially arranged along its length and interconnected sections, each of which is made of docked and interconnected N-thermal insulation elements with a cross section in the form of an annular sector (see patent RU-U1-N° 40433, 2004). OKB "GIDROPRESS", PJSC "ZiO-Podolsk" (g. Podolsk, Moscow region) in cooperation with the German company "KAEFER" developed and implemented modular removable thermal insulation (BST) for Tianwan NPP units (China) and for Kudankulam NPP units (India).

Fastening of BST on the equipment and pipelines is carried out by means of the special tension locks in advance established on blocks—about 60%, and the other—40% of locks are fastened by means of welding on installation of BST.

BST is a box made of austenitic steel. The cavity of the box is filled with thermal insulation material. Mats made of glass or basalt staple fiber are used as thermal insulation material. From movements inside the box insulation material is fixed with special pins and clips. After laying the insulating material, the box closes pulianas stainless foil, which is welded on the inner side of the block.

Fastening of all elements of the block with each other is performed by contact welding.

The units have the ability to replicate the surface of the heat-insulated equipment. This project is taken as a prototype.

However, the relatively thick-walled steel box BSTI (1.0 mm and 0.5 mm), due to the strength characteristics due to the large size of the blocks and mounting on the surface of a large number of tight tension locks, leads to irrational use of steel and thermal insulation material.

The ratio of weight of heat-insulating material to weight of blocks of BST is 31.3% (19 tons-heat-insulating material and 41.7 tons-steel) that leads to a conclusion about not rational presence of steel (68.7%) in a heat-insulating design of blocks.

The presence of tight tension locks on the surfaces of the blocks leads to a large thickness of the steel boxes, and the emergence of moments of the forces pushing due to the bending moments remove the blocks and uncover gaps surfaces of the blocks facing heat-insulated surface, which may result in additional temperature rise and deterioration of the insulating properties BSTI.

The invention is aimed at solving the problem of reducing the weight of stainless steel insulation blocks and creating guaranteed minimum gaps of the side surfaces of the blocks that shield the thermal discharge of the equipment.

The problem is solved by the fact that the box is made in the form of a connection consisting of a strong reinforcing frame grating and a thin-walled stainless steel facing sheet, forming a block of ASTI, while the reinforcing grating can be made with three—, four—, five—and hexagonal cell blocks ASTI are attached to each other by means of locks-latches installed in the corner junctions of external and internal grounds, mating among themselves, units of ASTI and consisting of portable and stationary grips cameras of hooks placed inside the blocks ASTI grips made in the form of curved flexible and elastic plates of the gripper with the possibility of compression, each hook is made in the form of stamped walls, fixed to the frame of the unit with stiffeners and stainless plate, wall hook sections form a plane, mutually contacting at docking with a surface of elastic plates of capture with the rounding placed coaxially of a line of joints of corners of lateral walls of blocks, and captures are connected among themselves by the ring spring fastened with elastic plates of capture and connecting them symmetrically concerning an axis of symmetry of captures with formation of the compensated flexible tightness.

The proposed design of the Assembly of the lock-latch with an annular spring allows for reliable contact of the surfaces of THE Asti blocks due to the guaranteed tightness in the inaccessible inner part of the touching side faces of the blocks to ensure their tight fit with each other. For further clarity, we define that the inside base of the insulating block taken unavailable the base of the unit, facing the heat insulated surface, and a cooler served by the base insulating block consider an external basis.

Thus, the patented reinforced removable thermal insulation (ASTI), which includes a lock-latch with guaranteed tension has the following differences from the prototype:

1. Heat-insulating blocks capable to save weight of a corrosion-proof metal of heat insulation, to increase durability of heat-insulating blocks, as much as possible to exclude disclosure of thermal gaps between lateral sides of heat-insulating blocks from inaccessible internal bases of heat insulation.

2. Increased thermal insulation reliability achieved by reliable contact of the side faces of thermal insulation blocks due to the use of guaranteed tightness between the hooks of thermal insulation blocks and the grips of locks-latches with guaranteed tightness.

Placement of hooks in the corners at the intersection of the lateral faces of the Asti block in the factory eliminates numerous fitting work and welding~6400 tension locks on the surface of the BTI blocks, installed individually in place during installation and Assembly work on the equipment.

When placing hooks inside Asti thermal insulation blocks, there is no deformation of hooks during transportation of removable thermal insulation blocks in cramped conditions during primary installation, dismantling and operation, as well as during routine inspections and control of metal heat exchange surfaces of nuclear power plants, there is a forgiveness of the design and reducing the number of tension locks in half.

In the future, the invention is explained by specific examples, which, however, are not the only possible ones, but clearly demonstrate the possibility of achieving the above technical results by the patented set of essential features.

Figure 1:
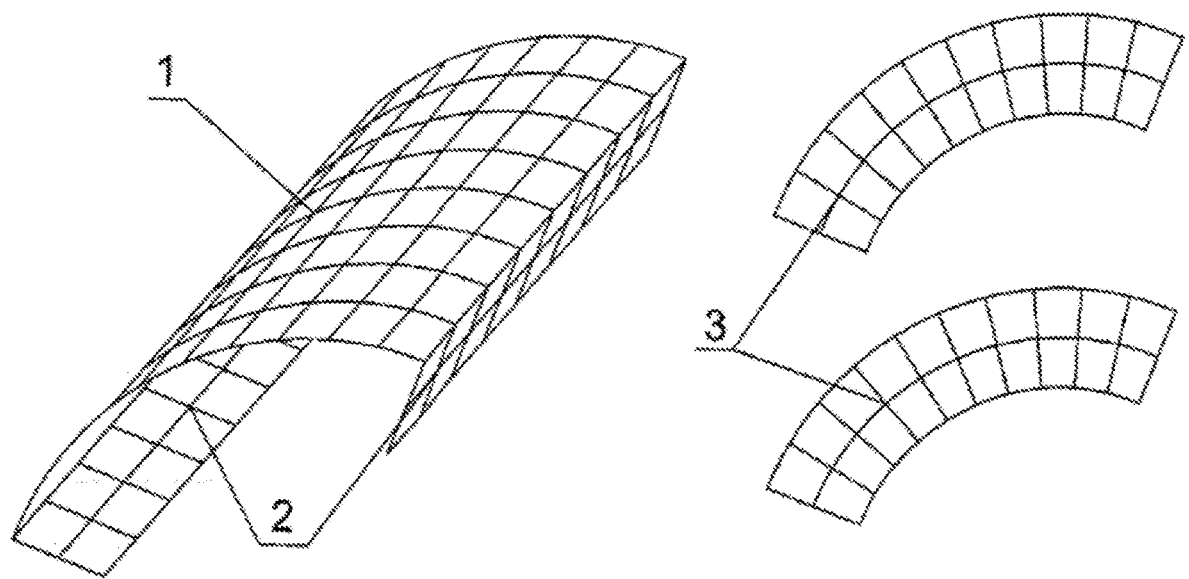
FIG. 1 shows the components of the frame, made of stainless steel lattice with a square cell.

The patented reinforced removable thermal insulation is made in the form of a structure similar in geometric shape and size to the block of the prototype of the BSTI. ASTI consists of a cylindrical part of the frame lattice 1 with side walls 2 and front walls 3 FIG. 1 of stainless stamped grooved washer 4 FIG. 2 with shelves 7 for contact welding, gutters 8 and a stainless thin-walled steel shell with a thickness of 0.1–0.4 mm –5 in FIG. 3.

The reinforcing lattice in the initial state for convenience and clarity of the image is selected with a square cell and a round cross-section of the bar, completely flat on both sides. However, it can be made with three, five, hexagonal and rectangular cell and different cross-section of the rod POS.20. It is preferable to use a lattice with a circular cross-section of the bar.

The stainless steel reinforcing frame grating can be pre-connected to the stainless facing sheet by electric welding without grooved washers.

Figure 2:
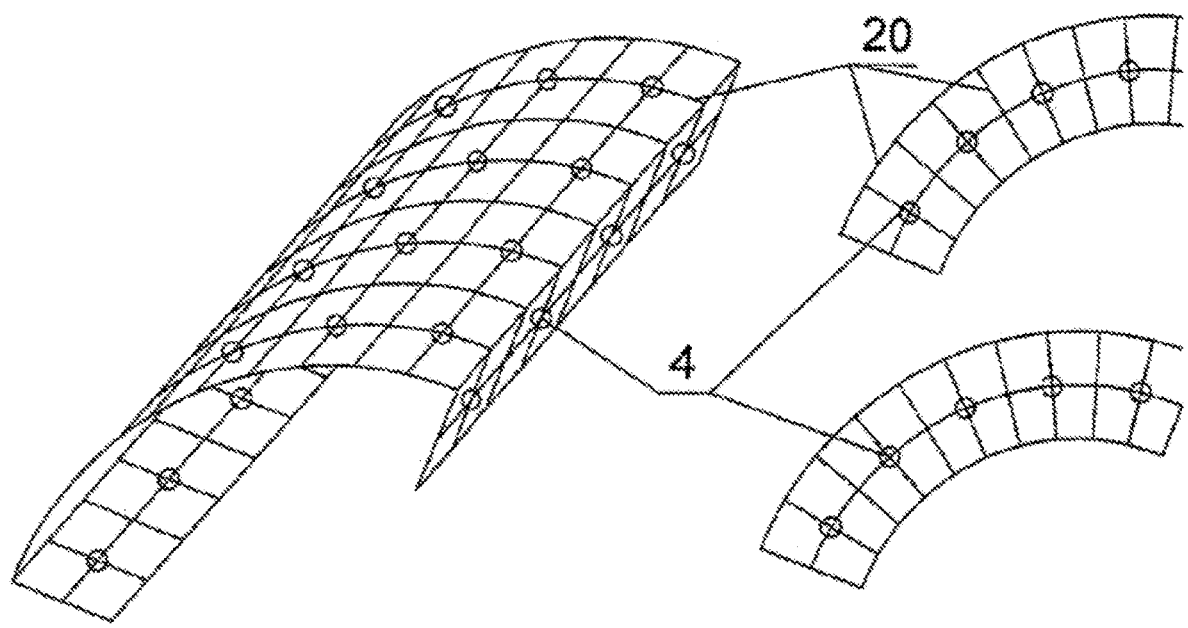
FIG. 2 shows the components of the frame with installed in the crosshairs of the lattice corrugated washers.
Figure 3:
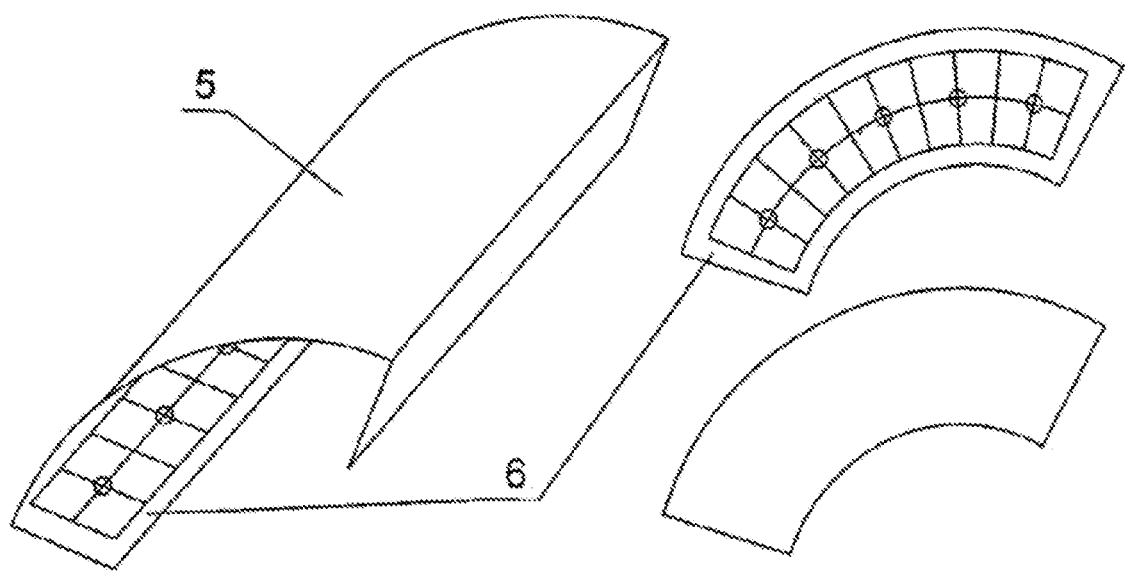
FIG. 3 shows the frame parts of the thermal insulation block, lined with a thin stainless steel sheet with an allowance on the perimeter, and welded by contact welding to the shelves of corrugated washers.
Figure 4:
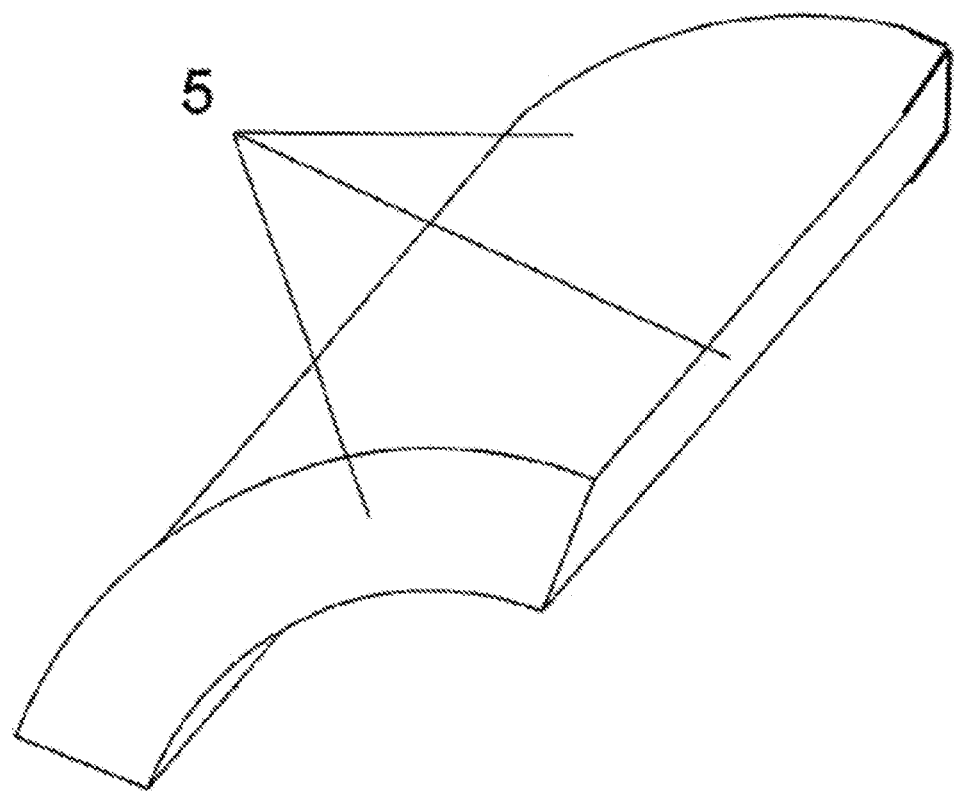
FIG. 4 shows assembled and welded by contact welding on the allowances of the facing sheet hollow block ASTI without insulation and the final inner base of stainless steel sheet-puklevki.
Figure 5:
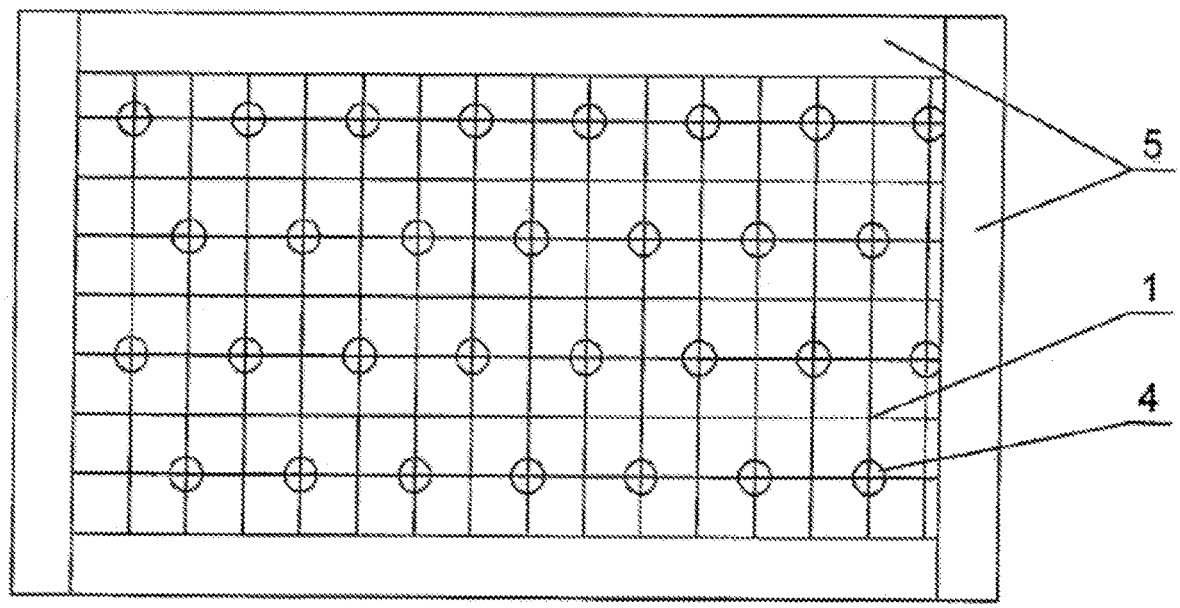
FIG. 5 shows the view of the hollow Asti block from the inner base.

Bars of the reinforcing frame lattice 20 in FIG. 2 can be made of a material other than stainless steel and various profiles, but the strength is not inferior to the strength of stainless steel bars and connected to a stainless facing sheet with corrugated washers.

Figure 6:
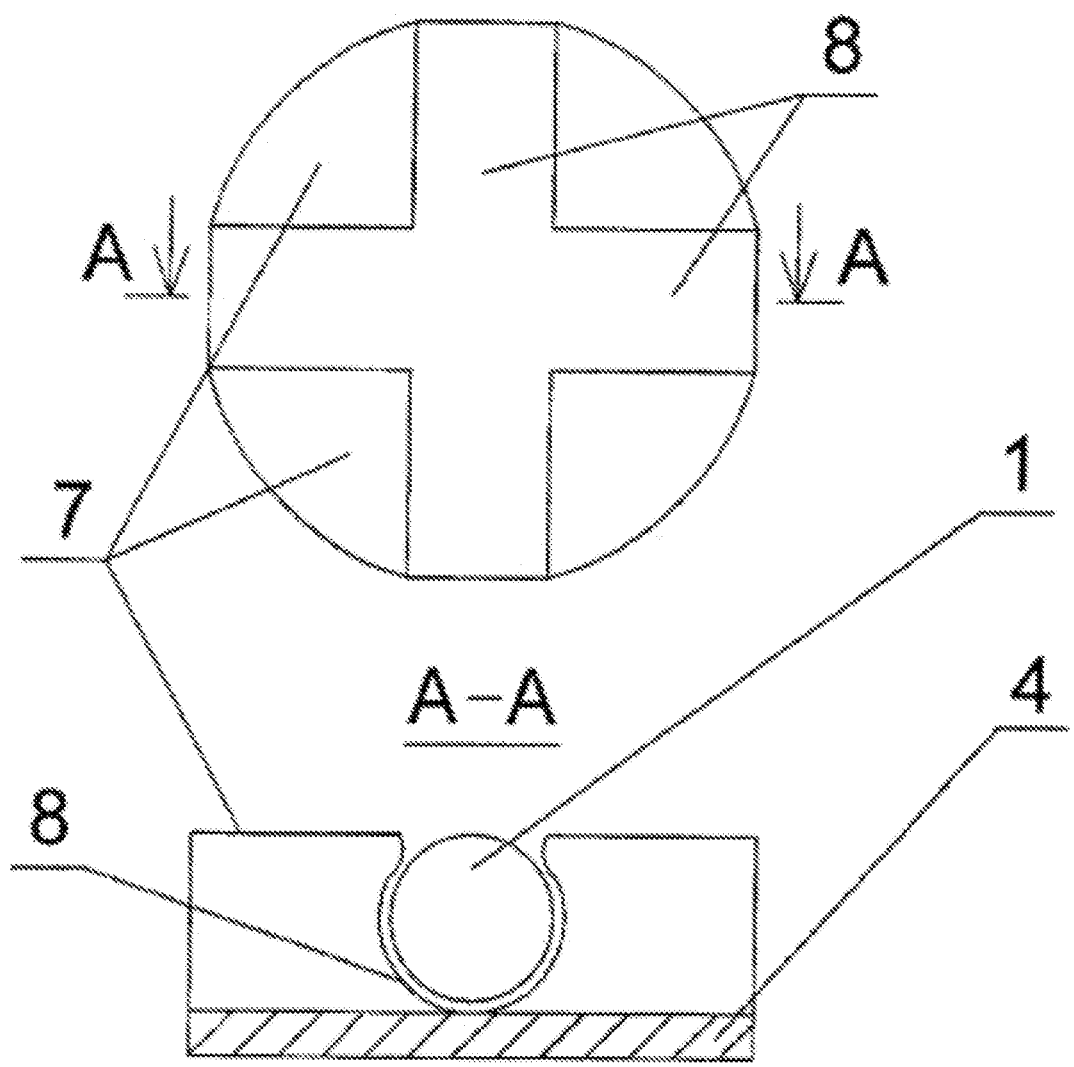
FIG. 6 shows a grooved washer.
Figure 7:
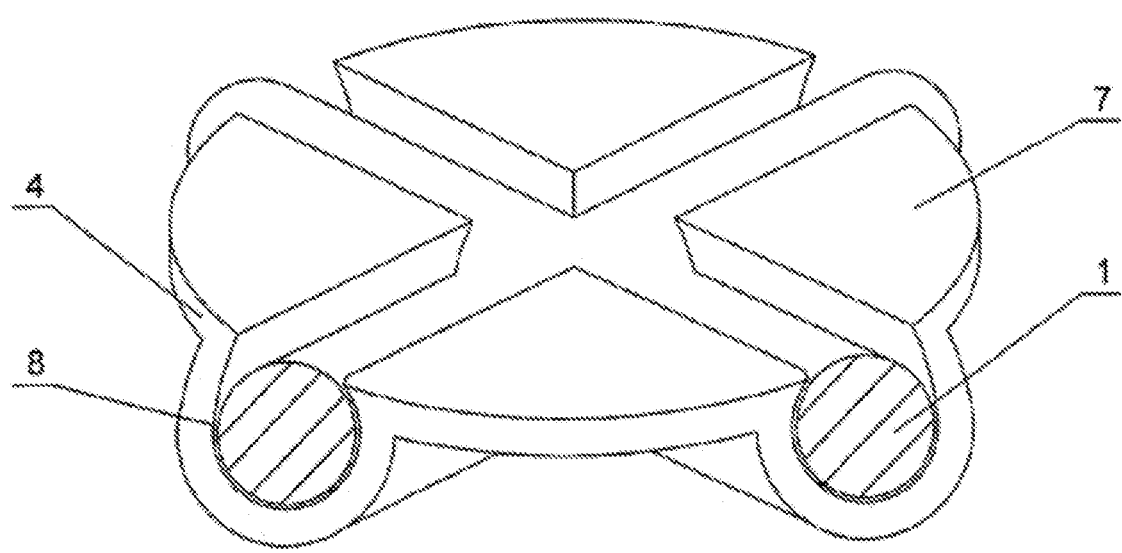
FIG. 7 shows a three-dimensional view of the corrugated washer.

Corrugated washers 4, made by stamping, have a design that allows them to be fixed and installed by shelves 7 figs when assembled with cross nodes of the reinforcing lattice.6 flush with the plane of the lattice. For this, the input part of the gutters 8 FIG. 6 has a slight narrowing. The shelf 7 of FIG. 6 are used for contact welding of corrugated washers with a thin-walled steel shell of the block. At the reinforcing skeleton lattice of small curvature that is characteristic for thermal isolation of the equipment of big diameters, corrugated washers practically flat, at small diameters of heat insulated pipelines at stamping of corrugated washers it is necessary to consider curvature of a surface of pipelines.

Figure 11:
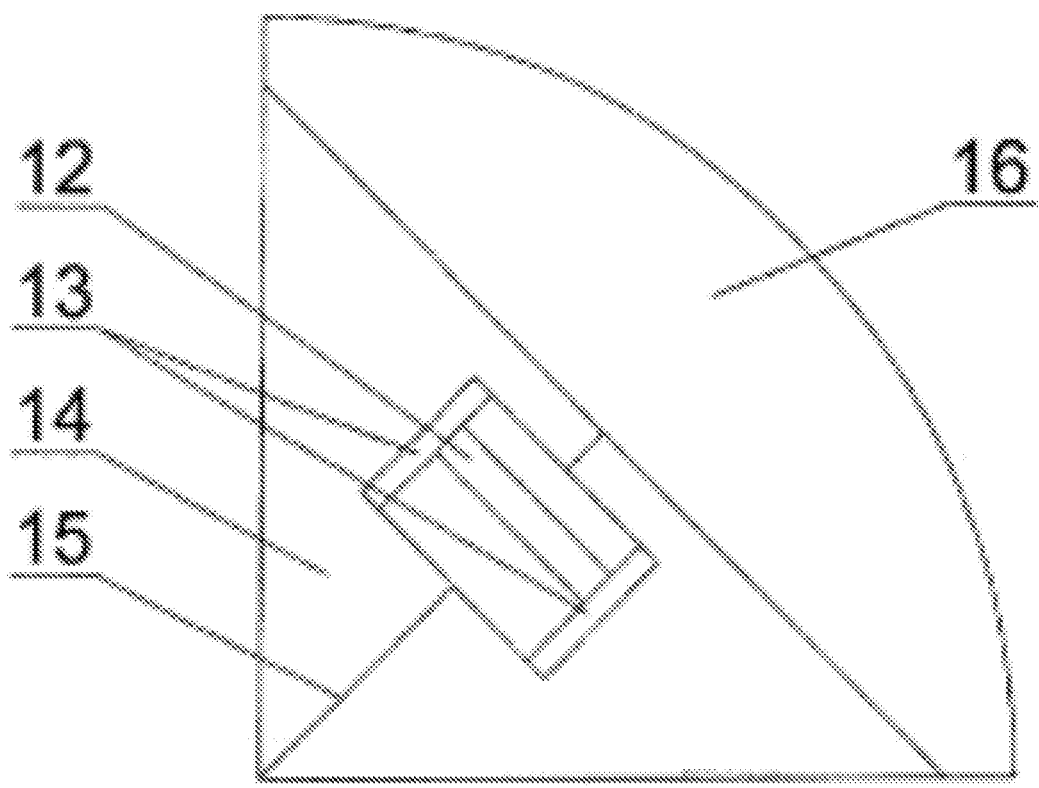
FIG. 11 shows the top view of the hook attached to the Asti block.
Figure 12:
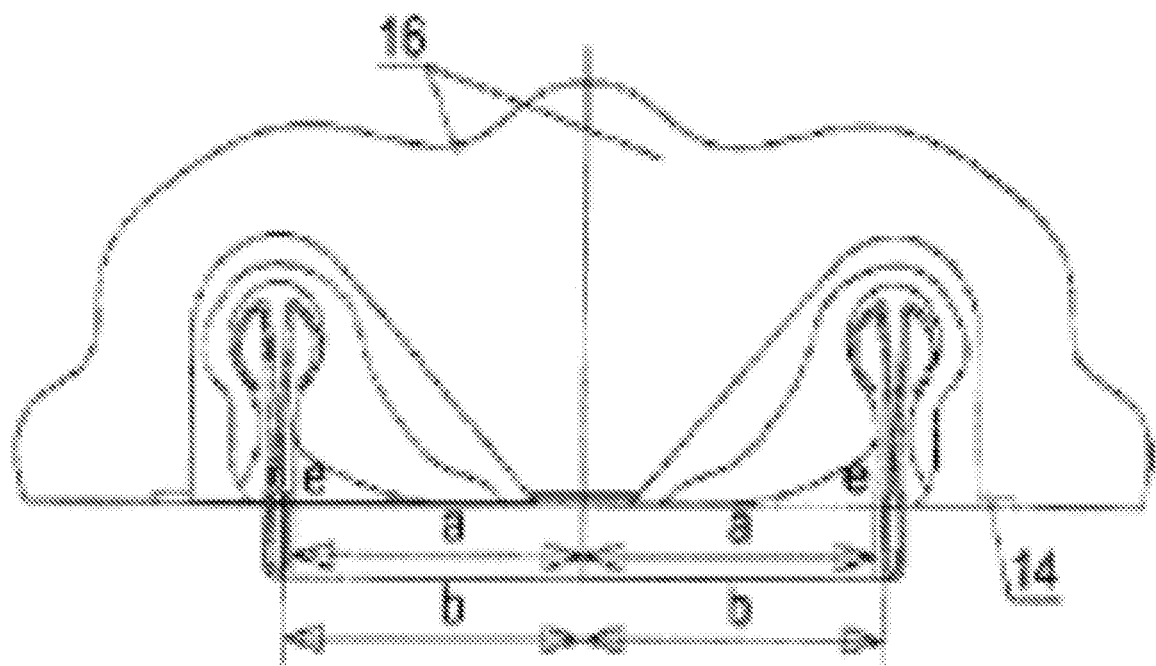
FIG. 12 shows the docking of thermal insulation blocks ASTI and fixing them with a lock-latch.
Figure 13:
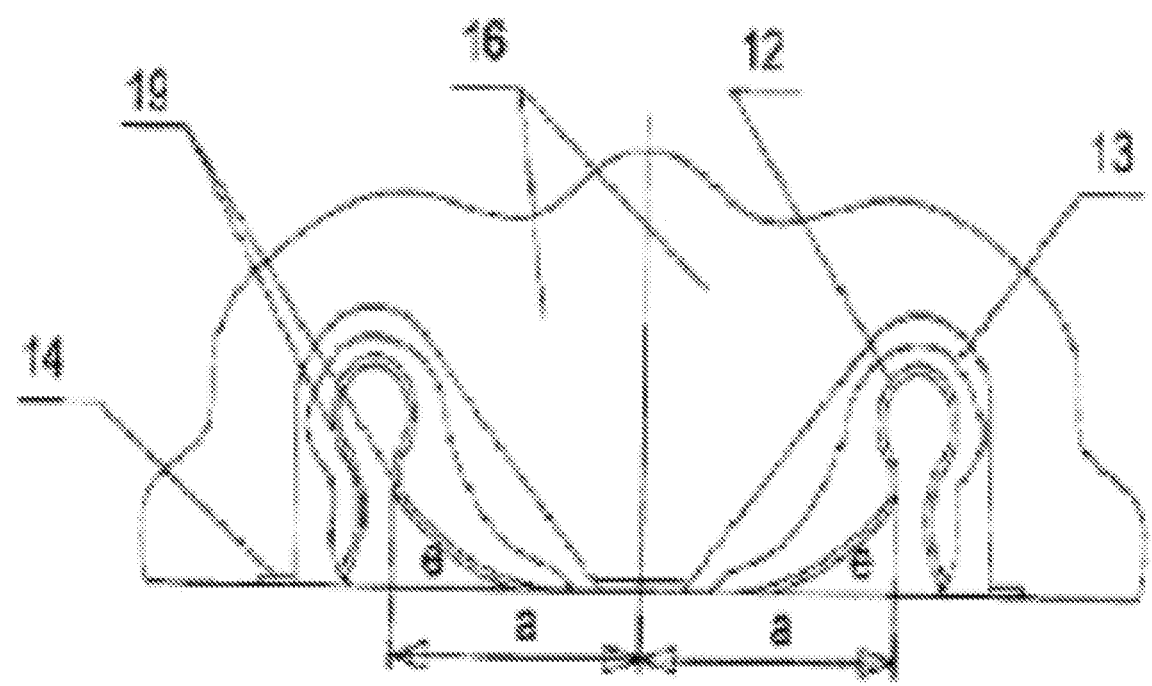
FIG. 13 shows the hooks installed on the blocks.

After installation of corrugated washers on the reinforcing grating, the grating and stainless metal thin-walled steel shell are flexible according to a template similar in geometric shape and size to the block of the prototype of the BSTI. In this case, a stainless metal thin-walled steel shell is selected with an appropriate allowance of 6 FIG. 3 around the perimeter. After production, Assembly design, install, hook 12 and the welding allowances on the facing sheet, hollow block ASTI 16 FIG. 11 fill with heat-insulating material, and then by means of contact welding on allowances fix the stainless puklevanny sheet.

Figure 14:
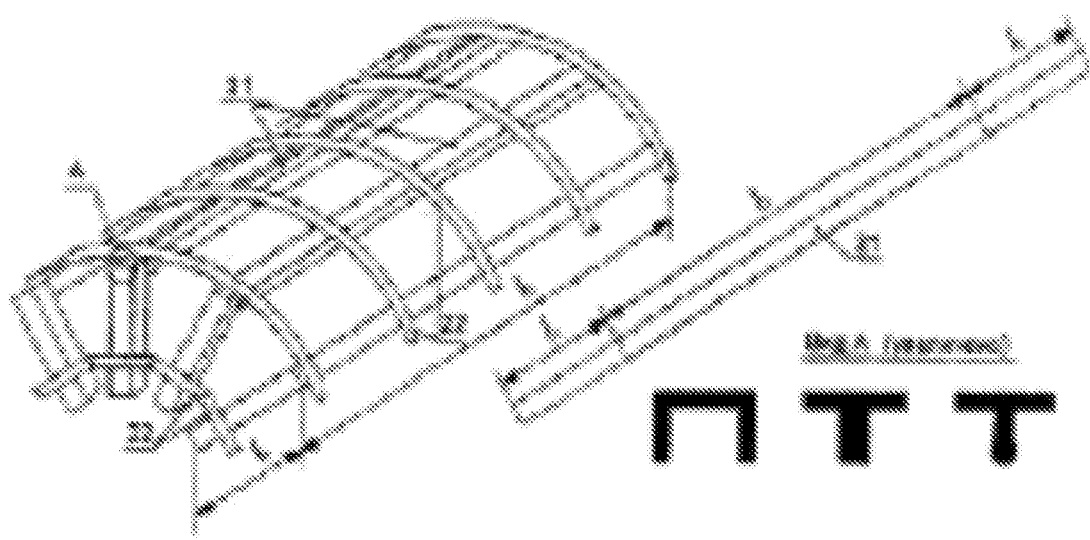
FIG. 14 shows the frame of the block, made of a lattice with profile reinforcement of one bar and the second bar-strip, connected by contact method.

Variant of application as part of the frame lattice reinforced profile of the bar-channel, brand and other profiles, 21 FIG. 14, connected to the bar-strip 22, which allows with minimal effort to make bends of the grid and connect the bars with the use of profile corrugated washers with the shape of troughs corresponding to the shape of the frame grid, allows to assemble the bearing frame of the ASTI unit in a unified manner for thermal insulation of any curvature of the equipment surface without the use of additional structural parts. The frame reinforcing lattice can be executed from the strengthened profile of a bar of different modifications. Produce such a grating with the corresponding step d of the strengthened profile of the rod and rod-bands and the linear dimensions of the lattice: h and h, where S is the height of the radial rod of the front side surface of the frame unit, which coincides with the thickness of the insulating layer of the block minus two thicknesses of steel lining, and the S-linear length of the block of ASTI, parallel to the axis of the insulated body or pipeline. Having performed the section of reinforcing profile shelves (channel, brand, etc.) on the border of dimensions and B, bending the profile strip at an angle of 90° at this border and connecting the cut profile shelves with each other in a contact way, we obtain a preliminary blank for the frame of the frontal side surface of the block. To obtain the final frontal surface, it is necessary to cut the lattice strips 22, connecting the radial billets of the reinforced bar, to bend the lattice along the outer surface in accordance with the required curvature of the ASTI block and fix the cut lattice strips with each other by a contact method, thus obtaining the frontal side surface of the block frame. In the same way it is necessary to arrive with a frontal lateral surface from other party of the block. Bending the strips of the frame lattice at the required angle, we obtain two adjacent side surfaces bordering the front side surfaces, which are then connected to each other by contact, fixing the entire side surface of the block frame.

Construction of a frame of the lattice with different profile bars that allow you to perform the structural frame unit of ASTI any curvature, leaves a constant and uniform step size and the estimated cell the outer surface of the frame, slimming, conservative, margin, spacing and size of the cell inner surface of the frame block of ASTI. This design creates a predetermined unification of the supporting frame of almost any Asti unit.

Figure 8:
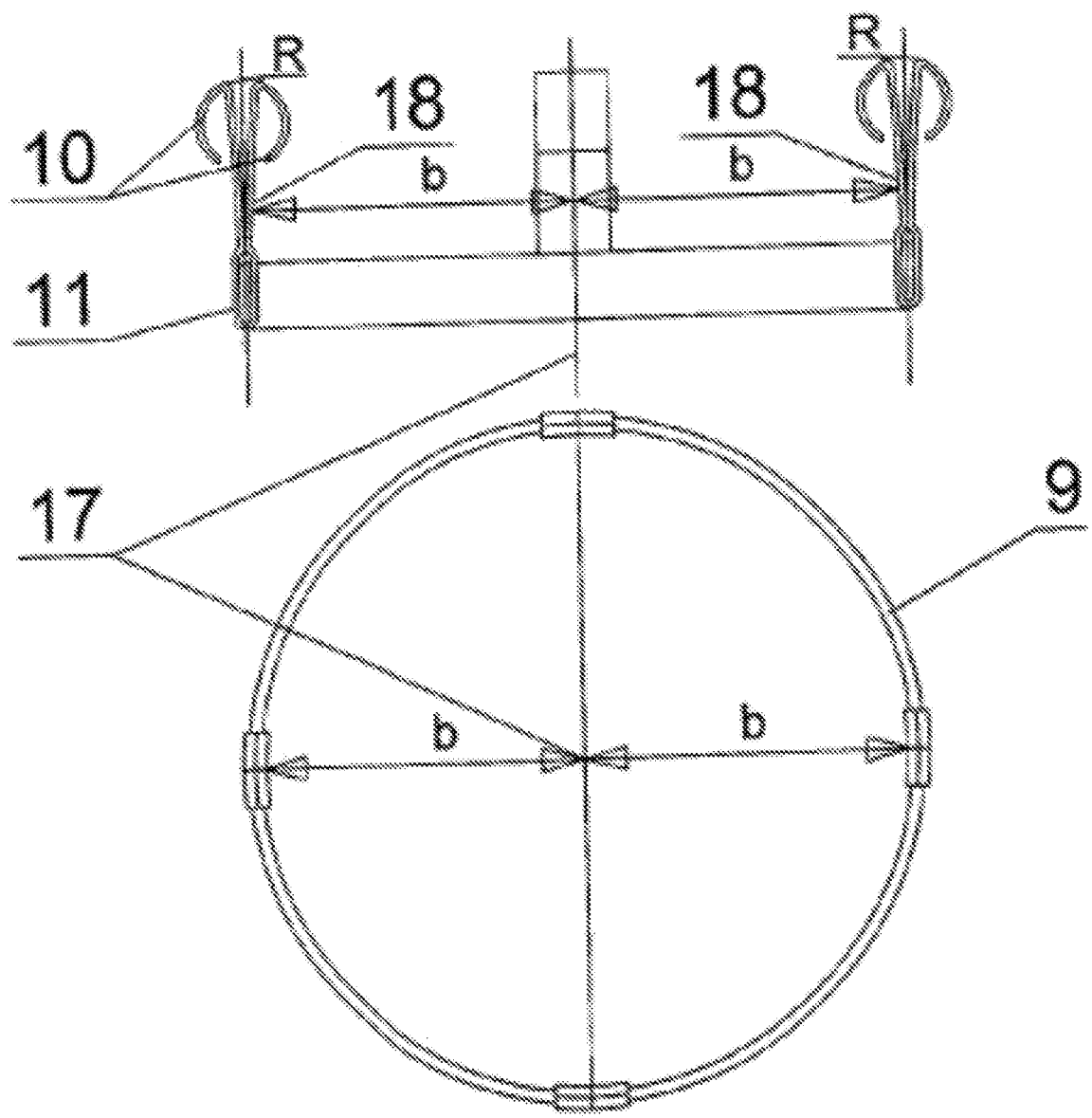
FIG. 8 shows the capture of the lock-latch.
Figure 9:
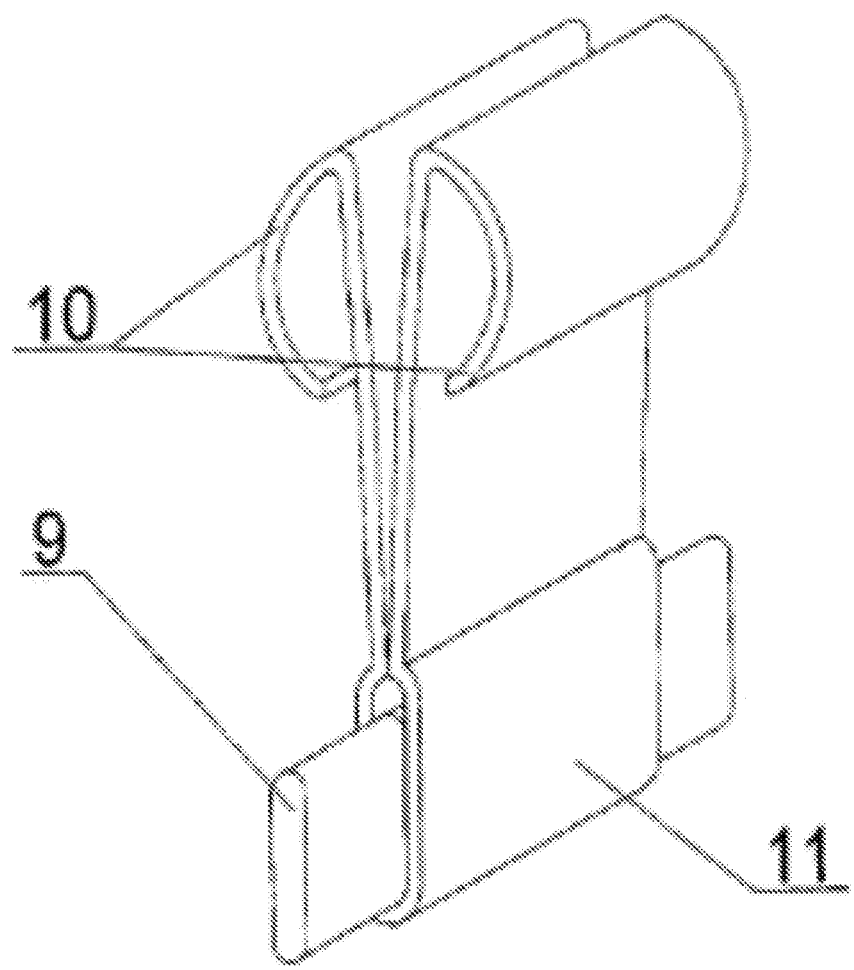
FIG. 9 shows a three-dimensional view of the lock-latch.

The lock-latch consists of a fixed part—a hook 12 and a portable part~a capture 10, 11, 18 in FIG. 8. The lock-latch installed at the intersections of the blocks of ASTI, that is one lock on one intersection or one lock on a single block of ASTI.

Figure 10:
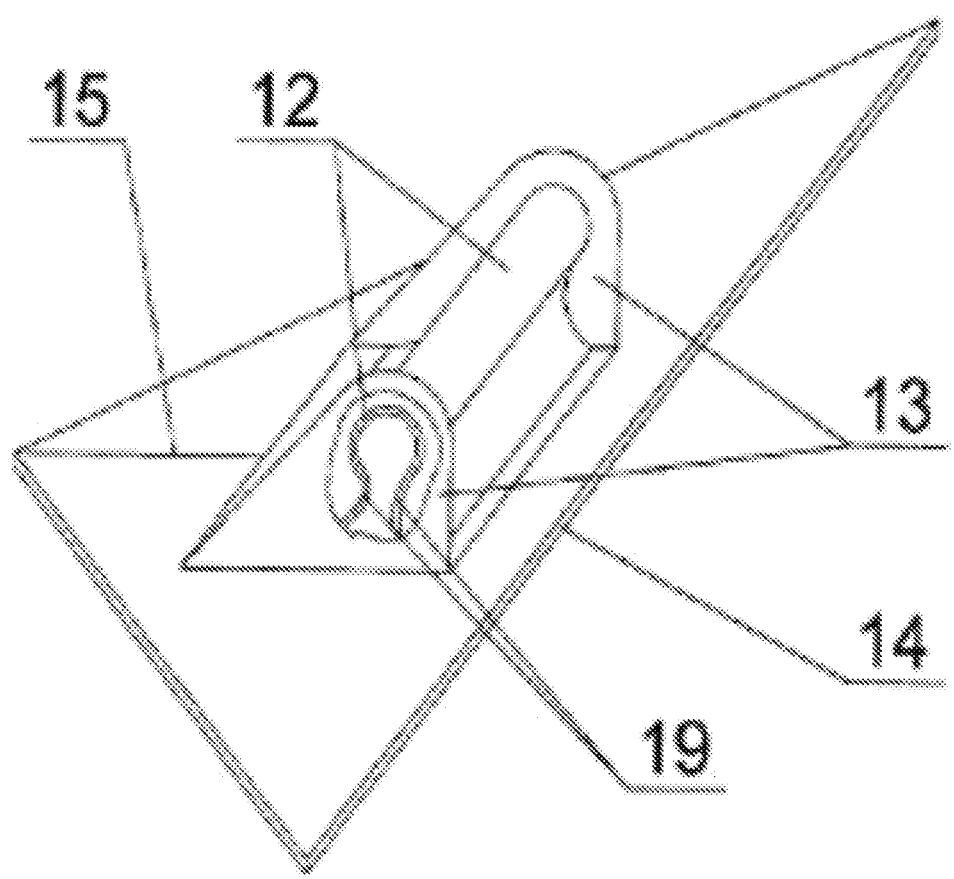
FIG. 10 shows a three-dimensional view of the hook lock-latch, mounted on a triangular plate.

The hook 12 of FIG. 10 is made of a stamped profile and by means of stiffeners 13 and argon-arc welding is attached to a triangular plate 14 perpendicular to its bisector 15 of a right angle. Then, before filling the hollow block ASTI thermal insulation material, using argon arc welding hook is attached to the frame and facing allowances block. It should be noted that, with a small size of the hook (25 mm in height and 20×30 mm in width and length), after its installation from above, it is necessary to install additional local thermal insulation.

Size a is the bisector distance from the top of the corner to the near wall POS. 19 folds of the camera hook, which is the interaction of the surface of the elastic wall of the capture 18. This distance is a constant size.

Size b is the distance from the axis of symmetry of the grips 17 to the surface of the elastic wall of the grip 18 interacting with the wall of the hook chamber. It is a variable size resulting from the torsion of the section and the elastic tension of the ring spring 9. Size C is the distance of guaranteed tightness considered in statics to the interaction (docking) of the grip and the hook.

Size C=a-b-guaranteed tension compensated during the interaction (docking) of the grip and the hook due to deformation of the ring spring, forming a flexible feedback during thermal expansion or cooling of the heat of the insulated body. The size C is obtained by docking as a result of the slip of the petals of the capture of 10 FIG. 8 with rounding radius along the inclined plane e of the hook chamber and the interaction of the surface of the elastic gripping wall with the wall of the hook chamber.

The annular spring 9, shown in FIG. 8, passing through the bases of FIG. 8 grippers and serving to tension the grippers and create a stable stiffness of the gripper Assembly with a spring, can be made flat, cylindrical or other shape, with or without connector. Normally the tension of the grip is due to the occurring elastic deformation: bending of plates the capture, elastic torsion and rectification of arcs of integral spring between the bases of a capture of blocks of ASTI, as the chord is always less than the arc length of a circle connecting chord. In the design of the lock-latch with three grips in the ultimate tension, the one-piece spring takes the form of a triangle, with four grips—the shape of a square or rectangle, and so on.

Due to the compensated guaranteed flexible tightness, tight contact and fixation of the side faces of the Asti thermal insulation blocks is provided, forming a flexible feedback during temperature fluctuations of the heat-insulated surface of the equipment.

The angle of inclination of the plane e of the camera hook depends on the angle of coverage of the surface of the block ASTI insulating surface.

Asti blocks are attached to each other with the help of locks, latches, installed at the corner intersections of the blocks, joined with the external and internal bases of the blocks. The fixed part, called a hook, is mounted inside the unit on the inner side and by means of ribs 13 and on the bisector of the right angle triangular 15 of the plate 14, to fill a hollow block of ASTI, with TIG welding the hook mounts on the frame and the allowances of the facing block.

The camera has a hook folds 19, passing that when docked petals 10 and the surface of the elastic wall 18 capture fix the movable hook relative to the first block ASTI. The movable gripper contacts the bases with the heat-insulated surface of the body. After its docking with the hook, a 3~15 mm isothermal thermal gap occurs between the heat-insulated body and the ASTI blocks, eliminating local temperature stresses on the surface of the body. The second block, joined with the capture of the same lock-latch, repeats the previous operation. In the same way the third and fourth blocks with one lock latch are joined. The fifth, sixth and so on blocks of ASTI are joined identically. Closing around the perimeter of the cylindrical part of the pipeline or cylindrical apparatus Asti blocks form a closed chain of blocks, self-retaining them on the heat-insulated surface.

If the lock latch is installed from the outer base of the Asti blocks, that is, the lock latch moves to the removable thermal insulation blocks to fix them, then the camera hook inclined plane e becomes vertical. In this case, all the arguments about the size of a and B, as well as the size of C remain the same.

When using a reinforced steel grating with a bar diameter of 2 mm (for comparison-the thickness of the stainless steel box is equal to 1 mm) and a square cell pitch of 60 mm, a steel shell thickness of 0.2 mm, corrugated washers thickness of 0.5 mm, a diameter of 15 mm obtained blocks ASTI the following data:

The thickness of the stainless thin-walled steel shell is equal TO $$S_1 = k_1 D \sqrt{P/[\sigma]}$$

The thickness of Asti stainless thin-walled steel shell is equal to $$\frac{S_1}{S_2} = \frac{k_1 D \sqrt{P}/[\sigma]}{k_2 d \sqrt{P}/[\sigma]} = \frac{k_1 D}{k_2 d}$$

reducing radicals, we find that $$S_2 = \frac{S_1 k_2 d}{k_1 D} = \frac{1.0 \cdot 0.56 \cdot 60}{0.43 \cdot 1000} = 0.078 \text{ mm}$$

where:

d-cell step of the frame reinforcing lattice of the Asti block,

D-maximum size of the shell of the BSTU block;

$S_1$ and $S_2$ respectively are thicknesses of stainless thin-walled steel shells of BST and ASTI;

$k_1$ and $k_2$-coefficients that take into account the method of fixing the edge of the cladding steel shells (Norms of calculation for the strength of equipment and pipelines of nuclear power plants. PNAE G-7-002-86 HM. Moscow, 1989). The formulas for calculating the thickness of the shell ASTI and BTI are taken conservatively in stock, as for a flat bottom working under a small external pressure, which most realistically displays the geometry and modes of operation of the blocks;

Given the thickness of the outer base BSTI equal $S_1=1.0$ mm, $k_1=0.56$ D=1000 mm, $k_2=0.43$, t=60 mm will receive prior strength equal to the thickness of the thin-walled stainless steel shell $S_2=0.078$ mm Taking the thickness of the thin-walled stainless steel shell 0.2 mm, the resulting margin of safety is equal to 2.56, that is, the shell block of ASTI 2.56 times stronger shell BSTI. According to the calculations of bending moments, the factor of safety is even higher since the linear dimensions in the formulas are included in square ratios.

When calculating the weight of Asti blocks, a reinforcing steel grating with a square cell with a step of 60 mm and a grating bar diameter of 2 mm is taken.

The calculated weight of the stainless steel BSTU blocks is 41.7 tons.

The calculated weight of stainless steel Asti blocks is 15.0 tons.

The saving of stainless steel is 26.7 tons.

The weight of the insulation material in both versions is 19.0 tons.

The relative percentage of the share of thermal insulation material in BSTU blocks is 31, 3%, the share of stainless steel is 68.7%.

The relative percentage of the share of thermal insulation material in ASTI blocks is 55.9%, the share of stainless steel is 44.1%.

The saving of stainless steel is 64.0%.

The estimated cost of Asti blocks will be at least two times cheaper.

Considering the use of corrugated steel washers for fastening the reinforcing frame lattice with a facing of thin steel using resistance welding, can be successfully replaced steel reinforcing rod grid on a larger cross-section of the rod, but of equal strength-section of non-metallic material, which will lead to even greater savings stainless steel.

The invention claimed is:

1. A removable thermal insulation comprising:
heat-insulating blocks, wherein:
   the heat-insulating blocks are made of a steel cladding sheet and filled with heat- insulating material,
   the heat-insulating blocks are interconnected by longitudinal side walls,
   the steel cladding sheet comprises a strong reinforced lattice;
the heat-insulating blocks being fastened together using locks positioned at intersections of each face of the heat-insulating blocks, wherein:
   the locks consist of grips and hooks,
   the grips are made in the form of rounded flexible and elastic gripping plates, whereby the grips are compressible,
   each hook is made in the form of stamped walls fixed to the block frame by means of stiffening ribs and a stainless plate,
   hook walls form sections with a plane mutually contacting when mating with the surface of the resilient gripping plates, and
   each gripper is interconnected by an annular spring fastened to the elastic gripping plates and connecting them symmetrically with respect to an axis of symmetry grippers with the formation of a compensated flexible tension.

2. The removable thermal insulation according to claim 1, characterized in that the steel cladding sheet is made of thickness S2, satisfying the ratio:

$$S2 > \frac{S_1 k_2 d}{k_1 d}$$

where:
d-cell step of the frame reinforcing grating,
S1-thickness of stainless steel block box sheet,
S2-the thickness of the steel cladding sheet,
k1-coefficient, umetyvayuschy method of fixing the edge of the box plate BSTI,
k2-coefficient, taking into account the method of fixing the edge of the Asti facing plate,
D-the maximum size of the blocks.

3. The removable thermal insulation according to claim 1, characterized in that the reinforced steel grating is made of bars with a diameter of 0.2 mm to 0.5 mm.

4. The removable thermal insulation according to claim 1, characterized in that the lattice is made of bars of circular cross-section or equivalent strength bars of another profile.

5. The removable thermal insulation according to claim 1, characterized in that the connection of the box is additionally provided with stamped corrugated washers with troughs with a narrowing of the input part for docking with the intersections of the reinforcing bars of the lattice, which is thus shelves of corrugated washers bonded to a thin-walled stainless steel sheet by means of contact welding.

6. The removable thermal insulation according to claim 5, characterized in that the washers are connected to a thin-walled stainless steel sheet by contact welding.

7. The removable thermal insulation according to claim 1, characterized in that the reinforcing lattice is connected to the facing sheet by electric welding.

8. The removable thermal insulation according to claim 1, characterized in that in the frame of the lattice there is one enhanced profile bar grille linear dimension parallel to the axis of the cylindrical surface of the removable thermal insulation and connected by contact movably with a second rod-strip, allowing unified to collect supporting framework of ASTI blocks for thermal insulation and any curvature of the surface of the removable thermal insulation.

* * * * *